United States Patent Office 2,914,390
Patented Nov. 24, 1959

2,914,390

FUEL FOR INTERNAL COMBUSTION ENGINES

Samuel M. Darling, Lyndhurst, and Robert W. Foreman, Cleveland, Ohio, assignors to The Standard Oil Company, Cleveland, Ohio, a corporation of Ohio No Drawing. Application February 8, 1954
Serial No. 408,982

1 Claim. (Cl. 44—58)

The present invention relates to a composition comprising a motor fuel for internal combustion engines which is capable of promoting engine cleanliness.

In United States Patents Nos. 2,331,923, 2,385,832 and 2,439,821 to John M. Musselman, there is described and claimed compositions of matter useful as addition agents to improve the characteristics of lubricating oils. Basically, the additives described in those patents are metal derivatives of a reaction product of a phosphorus sulfide and an ester wax. They are prepared by reacting a phosphorus sulfide, such as phosphorus pentasulfide, with an ester wax at an elevated temperature and then reacting the reaction product with one or more metal compounds to produce a metal derivative thereof.

In accordance with the present invention it has surprisingly been found that when an additive of the type described in the aforesaid Musselman patents is added together with a minor amount of a lubricating oil to a motor fuel, the resultant fuel can be used in an internal combustion engine with maximum engine cleanliness.

In order to provide optimum results only very small amounts of the additive and lubricating oil are required. It is recommended that the additive be incorporated in the fuel in an amount to provide from about 0.0001 to 0.01% sulfur, preferably from about 0.0005 to 0.005% sulfur, based on the total weight of fuel, i.e., the weight of fuel plus additive plus lubricating oil. Since the additive normally contains at least about 3% sulfur, this means that the recommended amount of additive is less than 0.4% by weight of the total fuel.

The amount of lubricating oil is widely variable but as a minimum should be at least about 25% by weight of the additive. As a maximum, the lubricating oil may be several times the weight of the additive with the only recommendation being that the combined weights of oil and additive should not exceed about 5.0% by weight of the total fuel.

In accordance with the preceding explanation, the invention pertains to a composition comprising a motor fuel containing a metal derivative of a phosphorus-sulfide-ester wax reaction product in an amount not exceeding about 0.4% by weight of the composition to provide from about 0.0001 to 0.01% sulfur by weight of the composition and a lubricating oil in an amount equal to at least 25% by weight of said metal derivative.

The metal derivative of the phosphorus-sulfide-ester wax reaction product can be prepared from the same ingredients and by the same procedure disclosed in the aforesaid Musselman patents. The phosphorus sulfide used in preparing the additive may be, for example, phosphorus pentasulfide or phosphorus trisulfide. The ester waxes which can be used include degras, lanolin, carnauba wax, Japan wax, sperm oil, etc. The metal compound which is reacted with the phosphorus sulfide-ester wax reaction product can be a compound of any metal such as sodium, potassium, barium, magnesium, lithium, strontium, calcium, chromium, aluminum, antimony, arsenic, mercury, bismuth, etc. and, if desired, a mixture of two or more of these metal compounds can be used. Preferably, the metal compound, or compounds, is reacted in the form of an oxide or hydroxide.

In the preparation of the additive the phosphorus sulfide and ester wax are reacted at an elevated temperature in the vicinity of 275 to 300° F. until a spontaneous exothermic reaction occurs and ceases. After the reaction, insoluble matter of sludge-like character is separated and the reaction product is next converted into a metal compound by heating with one of the aforesaid metal compounds.

The oil component of the additive may be any hydrocarbon oil of lubricating viscosity but best results are obtained with higher viscosity oils. The oil and additive may be added separately to the fuel but, in the preferred procedure, the oil is incorporated with the additive before addition to the fuel. This is preferably done by adding at least part of the oil as a diluent during the initial reaction of the phosphorus sulfide and ester wax. Additional oil can be added to the additive after its completion or can be added directly to the fuel. The function of the oil is not fully comprehended at the present time but it is believed that the oil in some way exerts a solvent effect upon engine deposits which renders the metal derivative of the phosphorus sulfide-ester wax reaction product more effective.

The combination of the additive and lubricating oil is effective in either leaded or unleaded motor fuel. Both the oil and additive are readily soluble in the fuel by simple mixing but it is convenient to first dissolve the oil and additive in a solvent such as benzene before addition to the fuel.

The following illustrate the formulation of several different preparations in which the oil and additive are formulated together for later addition to the fuel. Parts and percentages are by weight unless otherwise specified.

PREPARATION A

Into a reaction vessel equipped with a thermometer and stirrer, there was charged 56.6 pounds of degras, 25.7 pounds of phosphorus pentasulfide and 43.4 pounds of No. 225 Red oil (a conventional acid treated midcontinent lubricating oil base stock of SAE 20). The mixture was then heated at 285° F. for 1¾ hours and was then allowed to settle for 4 hours. The reaction product was decanted from the insoluble residue that had formed and was then filtered with the addition of 5% Speedplus (a filter aid). The filtrate was next saponified with 1% lime and 4% barium hydrate by heating at 200° F. for 2 hours and then raising the temperature to 250° F. for 30 minutes. The product of saponification was then filtered with the addition of 7% Speedplus. The product was found to contain 3.84% sulfur.

PREPARATION B

The procedure of Preparation A was followed to produce a preparation containing 3.5% sulfur.

PREPARATION C

In a mixing vessel there was placed 7.34 grams of the Preparation A and 1.84 grams of No. 225 Red oil. The two ingredients were blended to give a mixture containing 3% sulfur and there was then added 226.62 ml. of heavy solvent extracted oil having a viscosity of 820 SUS at 100° F. The resulting solution was diluted to 500 ml. with benzene.

PREPARATION D

In a mixing vessel there was placed 312.4 ml. of Preparation A and 82.8 ml. of No. 225 Red oil and 9064 ml. of heavy solvent extracted oil having a viscosity of 820 SUS at 100° F. The ingredients were stirred to form a solution and this was made up to 10 liters with benzene for use in gasoline.

PREPARATION E

In a mixing vessel there was placed 2373 grams of Preparation B which was diluted to 10 liters with benzene by stirring.

PREPARATION F

In a mixing vessel 7.34 grams of Preparation A was diluted to 100 ml. with benzene.

PREPARATION G

In a mixing vessel 50 grams of Preparation A was mixed with 12.5 grams of No. 225 Red oil and 9.2 grams of the mixture was diluted to 100 ml. with benzene.

In order to illustrate the effect of the foregoing preparations in motor fuel, the following examples are given. Parts and percentages are by weight.

Example 1

Preparation C was added to a leaded gasoline to provide a sulfur concentration of 0.002%. The gasoline was then tested in the conventional glass manifold test under the following conditions:

TABLE I.—CONDITIONS FOR GLASS MANIFOLD TEST

| | |
|---|---|
| Engine | CFR |
| Engine speed_____r.p.m__ | 600 |
| Jacket temp_____° F__ | 210 |
| Oil temp_____° F__ | 150 |
| Air intake_____° F__ | 95+5 |
| Fuel consumption: | |
| Lbs./hr. | 1.2 |
| Gal./hr. | 0.18 |
| Length of test_____hrs__ | 10 |
| Air/fuel ratio | Std. carburetion |
| Glass manifold: | |
| Length of Pyrex tube__inches__ | 16.75 |
| Dia. of Pyrex tube_____mm__ | 20 |
| Resistance of Nichrome coil ohms__ | 10 |
| Distance to coil from carburetor _____inches__ | 3 |
| Length tube covered by coil inches__ | 3.5 |
| Temp. of air 0.5 in. beyond coil__F__ | 170±5° |

The results of the test show that the gasoline containing the preparation left a deposit of 4.0 mg. whereas the same gasoline without the preparation left a deposit of 21.1 mg. The superiority of the gasoline containing the preparation is evident.

Example 2

Preparation D was added to a commercial leaded gasoline to provide a sulfur concentration of 0.002%. The gasoline was then tested in the Georgi idle test [1] with the engine operating under the following conditions:

TABLE II.—ENGINE TEST CONDITIONS

| | |
|---|---|
| Duration of test_____hours__ | 100 |
| Cycle, alternately_____ | Idle |
| Duration of cycle_____hours__ | 100 |
| Oil sump. temp_____° F__ | 125 |
| Water outlet temp_____° F__ | 130 |
| Engine speed_____r.p.m__ | 600 |
| Engine load_____B.H.P__ | 0 |
| Air/fuel ratio | Std. carburetion |
| Valve clearance: | |
| Inlet _____inches__ | 0.006 |
| Exhaust _____do____ | 0.013 |

The results of the test were as follows:

TABLE III.—GEORGI IDLE TEST

| Additive Conc. (wt. percent added S) | 50-hour test | | 100-hour test | |
|---|---|---|---|---|
| | None | 0.002 | None | 0.002 |
| Varnish and Sludge total | 81.25 | 90.75 | 80.50 | 87.75 |
| Varnish deposit ratings | 41.50 | 47.75 | 41.25 | 46.75 |
| Piston skirts | 9.75 | 9.75 | 9.50 | 9.75 |
| Rocker arm cover plate | 9.25 | 10.00 | 9.75 | 10.00 |
| Push rod cover plate | 7.75 | 9.50 | 7.50 | 9.00 |
| Cylinder walls | 7.00 | 8.75 | 7.25 | 8.50 |
| Crankcase oil pan | 7.75 | 9.75 | 7.25 | 9.50 |
| Sludge Deposit Ratings | 39.75 | 43.00 | 39.25 | 41.00 |
| Rocker arm assembly | 9.50 | 9.75 | 9.50 | 9.75 |
| Rocker arm cover plate | 9.75 | 9.75 | 9.75 | 9.50 |
| Push rod cover plate | 6.25 | 7.00 | 6.00 | 6.50 |
| Oil screen | 9.25 | 10.00 | 9.75 | 9.75 |
| Crankcase oil pan | 5.00 | 6.50 | 4.25 | 5.50 |
| Cold test ratings | 87.25 | 90.75 | 85.25 | 89.00 |
| Piston skirt varnish | 19.50 | 19.50 | 19.00 | 19.50 |
| Cylinder wall varnish | 15.50 | 17.50 | 14.50 | 17.00 |
| Side pan sludge | 12.50 | 14.00 | 12.00 | 13.00 |
| Rocker arm cover sludge | 9.75 | 9.75 | 9.75 | 9.50 |
| Stuck inlet valves | 10.00 | 10.00 | 10.00 | 9.50 |
| Stuck exhaust valves | 10.00 | 10.00 | 10.00 | 10.00 |
| Clogged oil rings | 10.00 | 10.00 | 10.00 | 10.00 |
| Stuck compression rings | 5.00 | 5.00 | 5.00 | 5.00 |
| | 5.00 | 5.00 | 5.00 | 5.00 |

From the higher ratings received by the fuel containing the preparation it is evident that it exerts a beneficial effect on engine cleanliness.

Example 3

Preparation E was added to a commercial leaded gasoline to provide a sulfur concentration of 0.0015%. The resulting gasoline was tested in the Atlantic ring-plugging test [2] under the following conditions:

TABLE IV.—ENGINE TEST CONDITIONS

| Duration of test (hours) | 70 | |
|---|---|---|
| Cycle, alternately | Low Load | Medium Duty. |
| Duration of cycle | 2 hours* | 3 hours. |
| Oil sump. temp. (° F.) | | 235. |
| Water outlet temp. (° F.) | 125 | 190. |
| Engine speed (r.p.m.) | 650 | 2,500. |
| Engine load (B.H.P.) | 2.9 | 45. |
| Air/fuel ratio | 9.0 | 13.5. |
| Valve clearance: | | |
| inlet (inches) | 0.010 | 0.010. |
| exhaust (inches) | 0.020 | 0.020. |

*Engine accelerated to 3150 r.p.m. for one minute every half-hour.

The results of this test were as follows:

TABLE V.—ATLANTIC RING-PLUGGING TEST

| Additive conc. (percent added S) | none | 0.0015 |
|---|---|---|
| Varnish and Sludge Total | 71.50 | 80.50 |
| Varnish deposit ratings | 36.00 | 40.00 |
| Piston skirts | 4.75 | 5.50 |
| Rocker arm cover plate | 8.25 | 9.50 |
| Push rod cover plate | 9.00 | 9.75 |
| Cylinder walls | 5.00 | 5.50 |
| Crankcase oil pan | 9.00 | 9.75 |
| Sludge deposit ratings | 35.50 | 40.50 |
| Rocker arm assembly | 8.00 | 9.00 |
| Rocker arm cover plate | 7.00 | 8.00 |
| Push rod cover plate | 6.25 | 7.00 |
| Oil screen | 9.25 | 10.00 |
| Crankcase oil pan | 5.00 | 6.50 |
| Cold test ratings | 68.75 | 74.00 |
| Piston skirt varnish | 9.50 | 11.00 |
| Cylinder wall varnish | 10.00 | 11.00 |
| Side pan sludge | 12.50 | 14.00 |
| Rocker arm cover sludge | 7.00 | 8.00 |
| Stuck inlet valves | 10.00 | 10.00 |
| Stuck exhaust valves | 10.00 | 10.00 |
| Clogged oil rings | 5.00 | 5.00 |
| Stuck compression rings | 4.75 | 5.00 |

---

[1] Georgi, "Effect of Engine Operating Conditions on Oil Contamination and Sludge Formation," paper presented before SAE Annual Meeting, Detroit, January 12-16, 1948.

[2] Test and Hall, "Oil Ring Plugging, a Missing Link in Laboratory Tests," paper presented before SAE National Fuels and Lubricants Meeting, St. Louis, Missouri, November 3-4, 1949.

Again, the higher ratings received by the motor fuel of the invention give evidence that the motor fuel additive exerts a beneficial effect on engine cleanliness.

*Example 4*

Preparation F was added to a motor fuel in varying concentrations to provide a sulfur concentration of 0.001%. The resultant gasoline was tested by the glass manifold test under the same conditions as in Example 1. The gasoline containing the additive left a residue of 1.9 mg. whereas the same gasoline containing no additive left a residue of 27.1 mg. Again, the superiority of the gasoline of the invention in promoting engine cleanliness is apparent.

*Example 5*

Preparation G was added to a commercial leaded gasoline in varying concentrations and the resultant gasoline blends were tested by the glass manifold test using the same conditions as in Example 1. The results of this test are as follows:

TABLE VI

| Percent added sulfur: | Deposit (mg.) |
|---|---|
| 0.0017 | 0.2 |
| 0.0013 | 0.2 |
| 0.0008 | 0.6 |
| 0.0006 | 0.9 |
| 0.0004 | 6.7 |
| None | 20.5 |

This example shows that within the limits of the invention, changes in concentration of the additive have little effect on engine cleanliness.

It is evident from the preceding examples that many changes and modifications can be made in the motor fuel of the invention without departing from the spirit of the invention. It is intended to cover all changes and modifications within the scope of the appended claim.

We claim:

A gasoline fuel for use in an internal combustion engine, which fuel exerts a beneficial effect on the cleanliness of the engine including the manifold thereof, consisting essentially of (1) a leaded gasoline motor fuel as the major component, (2) a metal derivative of a phosphorus pentasulfide-degras reaction product obtained by reacting degras with 18 to 25% phosphorus pentasulfide based on the degras at a temperature of 275 to 350° F., said metal being selected from the group consisting of calcium and barium and being introduced by reacting the sulfide-degras reaction product with a compound selected from the group consisting of oxides and hydroxides of said metal in an amount of 1.5 to 15% based on the sulfide-degras reaction product and at a temperature of 210 to 250° F., and said metal derivative also being present in an amount not exceeding about 0.4% by weight of the composition to provide from about 0.0001 to 0.01% sulfur by weight of the composition, and (3) a lubricating oil in an amount equal to at least 25% by weight of said metal derivative, the combined weight of lubricating oil and derivative not exceeding about 5.0% by weight of the composition.

References Cited in the file of this patent

UNITED STATES PATENTS

| 2,439,819 | Musselman | Apr. 20, 1948 |
| 2,439,820 | Musselman | Apr. 20, 1948 |
| 2,534,217 | Bartleson | Dec. 19, 1950 |
| 2,712,528 | Hill et al. | July 5, 1955 |
| 2,794,716 | Bartleson | June 4, 1957 |

FOREIGN PATENTS

| 419,690 | Great Britain | Nov. 16, 1934 |